United States Patent
Zolnay

(10) Patent No.: US 8,330,994 B2
(45) Date of Patent: Dec. 11, 2012

(54) METHOD FOR DIGITAL IMAGE ADAPTION FOR PRINTING AN IMAGE ON A PRINTING APPARATUS

(75) Inventor: András G. Zolnay, Tholen (NL)

(73) Assignee: OCE Technologies B.V., Venlo (NL)

( * ) Notice: Subject to any disclaimer, the term of this patent is extended or adjusted under 35 U.S.C. 154(b) by 0 days.

(21) Appl. No.: 13/478,672

(22) Filed: May 23, 2012

(65) Prior Publication Data
US 2012/0229826 A1    Sep. 13, 2012

Related U.S. Application Data

(63) Continuation of application No. PCT/EP2010/068028, filed on Nov. 23, 2010.

(30) Foreign Application Priority Data

Nov. 24, 2009 (EP) .................... 09176856

(51) Int. Cl.
*H04N 1/60* (2006.01)

(52) U.S. Cl. ............ 358/1.9; 358/518; 358/520

(58) Field of Classification Search ............ 358/1.9, 358/2.1, 3.26, 518, 520, 525; 382/162, 167; 345/590, 591

See application file for complete search history.

(56) References Cited

U.S. PATENT DOCUMENTS

| | | | |
|---|---|---|---|
| 5,767,992 A | 6/1998 | Tanaka et al. | |
| 5,937,089 A | 8/1999 | Kobayashi | |
| 7,127,102 B2 * | 10/2006 | Hiramatsu et al. | 382/162 |
| 2002/0031256 A1 * | 3/2002 | Hiramatsu et al. | 382/162 |
| 2003/0184779 A1 * | 10/2003 | Ohga | 358/1.9 |
| 2007/0236506 A1 | 10/2007 | Tin | |
| 2007/0296988 A1 * | 12/2007 | Tsuji | 358/1.9 |
| 2009/0122372 A1 * | 5/2009 | Miyahara et al. | 358/520 |

FOREIGN PATENT DOCUMENTS

| | | |
|---|---|---|
| EP | 0 967 791 A2 | 12/1999 |
| EP | 1 351 487 A2 | 10/2003 |
| EP | 1 909 486 A2 | 4/2008 |
| JP | 2006-340107 A | 12/2006 |

OTHER PUBLICATIONS

Braun et al. "Gamut Mapping for Pictorial Images", TAGA Proceedings, XX, XX, Jan. 1, 1999, pp. 645-660, XP008078676.

Morovic et al., "The Fundamentals of Gamut Mapping: A Survey", Journal of Imaging Science and Technology, vol. 45, No. 3, May-Jun. 2001, pp. 283-290, XP008017721, ISSN: 1062-3701.

Stone et al., "Color Gamut Mapping and the Printing of Digital Color Images", ACM Transactions on Graphics, vol. 7, No. 4, Oct. 1, 1988, pp. 249-292, XP000600596, ISSN: 0730-0301.

* cited by examiner

*Primary Examiner* — Kimberly A Williams

(74) *Attorney, Agent, or Firm* — Birch, Stewart, Kolasch & Birch, LLP

(57) ABSTRACT

A method for mapping source colors of an image to destination colors reproducible by an printing apparatus, the source colors and destination colors having a lightness component, wherein the transformation includes a translation and a rotation, the combination of which maps the source black point onto the destination black point and source white point onto a point on the destination lightness line, a compression which maps the rotated and translated source white point onto the destination white point and in which the destination black point is a fixed point, and a gamut mapping, which leaves the lightness component of each color unchanged and maps each compressed color onto a destination color.

14 Claims, 9 Drawing Sheets

METHOD FOR DIGITAL IMAGE ADAPTION FOR PRINTING AN IMAGE ON A PRINTING APPARATUS

CROSS-REFERENCE TO RELATED APPLICATIONS

This application is a Continuation of International Application No. PCT/EP2010/068028, filed on Nov. 23, 2010, and for which priority is claimed under 35 U.S.C. §120, and which claims priority under 35 U.S.C. §119 to Application No. 09176856.4, filed on Nov. 24, 2009 in Europe. The entirety of each of the above-identified applications is expressly incorporated herein by reference.

BACKGROUND OF THE INVENTION

1. Field of the Invention

The present invention relates to a method for mapping source colors of an image to destination colors reproducible by a printing apparatus, the source colors and destination colors having a lightness component, the method comprising the steps of defining one of the source colors as a source black point, defining one of the source colors as a source white point, defining a source lightness line comprising the source black point and the source white point, defining one of the destination colors as a destination black point, defining one of the destination colors as a destination white point, defining a destination lightness line comprising the destination black point and the destination white point, defining a transformation from the source colors to the destination colors, the transformation mapping the source white point onto the destination white point and the source black point onto the destination black point, and applying the defined transformation to the source colors.

2. Background of the Invention

A digital image consists of pixels, which are defined as points in a color space, e.g. an RGB color space, an XYZ color space or an L*a*b* color space. In an RGB color space, each pixel is defined by three coordinates, which represent the red, green and blue color component of the pixel respectively. In an L*a*b* color space, each pixel is defined by three coordinates, which represent the lightness of the pixel, its position between red/magenta and green and its position between yellow and blue, respectively. Each coordinate represents a property of each point in the color space.

The source colors of the image may be defined as a part of the color space, which contains only those points of the color space that are also part of the representation of the colors of the digital image in the color space. The collection of source colors is often referred to as the image gamut. The destination colors reproducible by a printing apparatus may be defined as the part of the color space that contains all of the colors that can be printed by the printing apparatus. The collection of destination colors is often referred to as the printer gamut. In practice, the printer gamut is often smaller in size than the image gamut. This means that a point of the image gamut may not be a point in the printer gamut and cannot be printed according to the coordinates of that point. Normally, points of the image gamut are mapped on the points of the printer gamut in a particular way. After such a mapping, the printing apparatus is able to print the mapped image.

It is recommended to implement a mapping from an image to a printable image, as described above, in such a way that at least one property of the points in the image is maintained as far as possible. For example, one wants to maintain a perceived lightness of the image or local details of the image. An algorithm for mapping images may be used in many of the currently available color management software, which may be implemented in a controller of a printing apparatus. Often, such an algorithm contains a mapping of a color space towards the same color space, which is decomposed into a scaling step in the directions of the three coordinate axes of the color space and an offset step. Such a mapping scales the complete image gamut in three directions and normally takes into account the possible ranges of the coordinates in the printer gamut. Such a mapping may take into account a deviating axis of a property of the printer gamut, e.g. a lightness axis. This results in a so-called black and white point correction algorithm. A printer displays color images in its unique way. A printer may be calibrated using look-up tables (LUTs) or with an ICC style color management, which relies on color profiles to ensure that images are reproduced and displayed accurately. Part of creating a LUT may be a black and white point correction.

A black and white point correction is an operation that matches perceived black of the image to the darkest printer lightness and perceived white of the image to the brightest printer lightness. It is critical for a pleasing reproduction of images. Black and white point correction may be automatically included in a gamut mapping algorithm or it may be performed as a pre- or post-processing step, in addition to a gamut mapping.

The following method, also called a scaling-and-offset algorithm, is used in many of the currently available color management software. The International Color Consortium ICC recommends inclusion of this simple method into a perceptual rendering intent. There are slight differences between implementations; nevertheless, the common basic structure may be summarized as follows. The algorithm performs a transformation in a color space, for example an XYZ color space which maps source black and white points onto destination black and white points, respectively:

$$XYZ_{src\text{-}black} \Rightarrow XYZ_{dest\text{-}black} \tag{1}$$

$$XYZ_{src\text{-}white} \Rightarrow XYZ_{dest\text{-}white} \tag{2}$$

The transformation is defined by a scaling matrix and an offset vector and has six free parameters. The transformation is described in a formula:

$$\begin{pmatrix} X' \\ Y' \\ Z' \end{pmatrix} = \begin{pmatrix} Sx & 0 & 0 \\ 0 & Sy & 0 \\ 0 & 0 & Sz \end{pmatrix} \begin{pmatrix} X \\ Y \\ Z \end{pmatrix} + \begin{pmatrix} Ox \\ Oy \\ Oz \end{pmatrix} \tag{3}$$

After calculating the three free parameters $s_X$, $s_Y$, $s_Z$ of the scaling matrix and the three free parameters $o_X$, $o_Y$, $o_Z$ of the offset vector, all colors of the image undergo this simple affine transformation. An example of a flow diagram of this transformation is given in FIG. 3a and will be described further on. Although the algorithm is widely used, its application has serious disadvantages:

In case of a printing apparatus as a destination device, the parameters $s_X$, $s_Y$, $s_Z$ on the diagonal of the scaling matrix get values around 0.8. Consequently, the linear scaling can be seen as compression by approximately 20% in all three XYZ directions.

The transformation compresses in all three XYZ directions. Consequently, it compresses the color distance between each color pair. In other words, this algorithm leads to a loss in both local and global contrast of approximately 15% measured in CIE$\Delta$E units, which units are defined by the *International Commission on Illumination* (CIE), which introduced a number of distance metrics ΔE. For example $\Delta E^*_{ab}$ is defined as follows: using $(L^*_1, a^*_1, b^*_1)$ and $(L^*_2, a^*_2, b^*_2)$, two colors in a L*a*b* color space, $$\Delta E^*_{ab} = \sqrt{(L^*_2 - L^*_1)^2 + (a^*_2 - a^*_1)^2 + (b^*_2 - b^*_1)^2}$$

Finally, unlike many gamut mapping algorithms, this method changes all colors, even those lying inside the printer gamut. Hence, every color pair or complete images fitting into the gamut undergo this compression.

SUMMARY OF THE INVENTION

The object of the present invention is to create an algorithm aimed at improving a black and white point correction of a digital image to be printed.

The object of the present invention is achieved in a method for mapping source colors of an image to destination colors reproducible by a printing apparatus, wherein the transformation comprises a translation and a rotation, the combination of which maps the source black point onto the destination black point and source white point onto a point on the destination lightness line, a compression which maps the rotated and translated source white point onto the destination white point and in which the destination black point is a fixed point, and a gamut mapping, which leaves the lightness component of each color unchanged and maps each compressed color onto a destination color.

The transformation comprises a translation and a rotation. The translation may be carried out first, followed by the rotation, or the other way around. A translation of the color space does not change the distances between points in the color space. Similarly rotation matrices have unity eigenvalues, and therefore, do not change distance between color points. Hence, distances between color points remained unchanged so far. Only in the step in which a compression is performed, distances between color points are changed. However, the compression is carried out in one direction only, being the direction of the destination lightness line. An advantage of compressing in a single direction is that color distances measured on planes orthogonal to the destination lightness line remain unchanged. In comparison with the previously known scaling-and-offset algorithm, compression is applied in this case only in a single direction rather than in three color directions to the same extent (approximately 20%).

By means of the application of the translation, rotation and compression the source black point is mapped to the destination black point and the source white point is mapped to the destination white point, even after the translation and the rotation, the rotated and translated source lightness line coincides with the destination lightness line. Therefore, this is a kind of black and white correction with a different decomposition in mapping than mapping according to the previous known scaling-and-offset algorithm.

Also, a gamut mapping is applied, which leaves the lightness component of each color unchanged and maps each compressed color onto a destination color. An embodiment of such a gamut mapping may be a gamut mapping, which projects an out of gamut color perpendicular to the lightness axis onto a color of the printer gamut, which is encountered first and resides on the surface of the printer gamut. In this way, the lightness component of the color is unchanged.

The particular gamut mapping method used is, however, not part of the present invention. Other gamut mapping methods than the one described may also be contemplated.

According to an embodiment, the method is characterized in that the compression is only established in the direction of the destination lightness axis. In this way a chroma component is unchanged for each color in the color space, only the lightness component is changed and the color fastness is preserved.

According to an embodiment of the present invention, the translation precedes the rotation. By means of the translation of the source lightness line, the source black point is mapped to the destination black point. After the translation, a rotation is carried out. The destination black point is used as a center of the rotation and the rotation angle is such that the translated source lightness line is mapped onto the destination lightness line. In this manner, the image gamut with respect to the lightness property is tuned to the printer gamut without changing the distances between the source colors. Another advantage of this embodiment is that the combination of the translation and the rotation is defined uniquely and is easily calculated.

According to an embodiment of the present invention, the translation is defined by the difference vector of the destination black point and the source black point. In this way, the translation is uniquely defined and achieves that the source black point is mapped to the destination black point.

According to an embodiment of the present invention, the rotation is defined by an angle between the destination lightness line and the source lightness line and a center of rotation is the destination black point. After the translation according to the previous embodiment, the translated source lightness line and the destination lightness line have an intersection point, namely the destination black point. Thus, both lines lie in a plane defined by both lines. Since both lines lie in the same plane, it is easy to determine an angle between the two lines. Such an angle is then used as a rotation angle for the rotation.

According to another embodiment of the present invention the rotation precedes the translation. An advantage is that the center of rotation may be an arbitrary point on the source lightness line, and the rotation center may be chosen in such a way that the calculations become easy and fast. By means of the rotation, the source lightness line is mapped to a line parallel to the destination lightness line. After the rotation, a translation is carried out. By means of this translation, the rotated source black point is mapped onto the destination black point. In this manner, the image gamut with respect to the lightness property is tuned to the printer gamut without changing the distances of the source colors.

According to an embodiment of the present invention, the rotation is defined by an angle between the destination lightness line and the source lightness line and a center of rotation is any point on the source lightness line. In most cases, these two lines do not lie in the same plane. In such a case, the rotation angle may be defined as being an angle between the destination lightness line and an auxiliary line parallel to the source lightness line. The auxiliary line is selected in such a way that the auxiliary line and the destination lightness line lie in a same plane. The rotation is then followed by a translation, which maps the rotated source black point on the destination black point.

According to an embodiment of the present invention, the translation is defined by the difference vector of the destination black point and the rotated source black point. After the rotation is carried out, the difference vector is uniquely and easily calculated and achieves that the rotated source black point is mapped onto the destination black point.

According to an embodiment of the present invention, the source black point has a minimum lightness component among the colors on a lightness axis of a color space in which the image is defined. The source colors of the image are defined as colors in a color space. Such a color space has a lightness axis, on which lies a point of minimum lightness. This point may be called the source black point.

According to an embodiment of the present invention, the source white point has a maximum lightness component among the colors on a lightness axis of a color space in which the image is defined. The source colors of the image are defined as colors in a color space. Such a color space has a lightness axis, on which lies a point of maximum lightness. This point may be called the source white point.

According to an embodiment of the present invention, the destination black point has a minimum lightness component among the destination colors reproducible by the printing apparatus. In general, the destination black point does not equal the source black point. Therefore, a transformation from a source black point to a destination black point is necessary when printing the image of source colors on the printing apparatus.

According to an embodiment of the present invention, the destination white point has a maximum lightness component among the destination colors reproducible by the printing apparatus. In general, the destination white point does not equal the source white point. Therefore, a transformation from a source white point to a destination white point is necessary when printing the image of source colors on the printing apparatus.

According to an embodiment of the present invention, the compression is defined by a piece-wise linear lightness compression function, which is determined by the steps of dividing the destination lightness line between the translated and rotated source white point and the translated and rotated source black point into a plurality of pieces, defining for each piece a linear mapping from said piece to a part of the lightness components of the destination colors, said linear mapping having a steepness, the value of which has to be determined, defining the lightness compression function as a composed linear mapping consisting of the plurality of linear mappings, determining the steepness of each linear mapping of the lightness compression function by the steps of defining a first measure in the color space for the distance between the lightness component of a translated and rotated source color and the lightness component of a corresponding destination color, defining a second measure in the color space for the distance between a lightness contrast of neighboring translated and rotated source colors and a lightness contrast of corresponding neighboring destination colors, defining a first constraint for the steepness values to establish that the mapped lightness components of the translated and rotated source colors lie on the destination lightness line between the destination black point and the destination white point and computing by means of mathematical optimization for the image the values of the steepness of the pieces, wherein said optimization takes the first measure, the second measure and the first constraint into account.

Such a piece-wise linear lightness compression in a direction of the destination lightness line of the color space is faster than alternative mappings on all coordinates of the color space. The piece-wise linear lightness compression is defined by a function applied to a lightness component of a source color and resulting in a lightness component of a destination color. Each linear piece has a projection on the axis of the lightness components of the translated and rotated source colors, which projection has a predetermined length. Each piece has also a steepness value of a collection of steepness values.

The collection of steepness values may be the outcome of a mathematical optimization problem. In mathematics and computer science, optimization, or mathematical programming, refers to choosing the best element from some set of available alternatives. In the simplest case, this means solving problems in which one seeks to minimize or maximize a real function by systematically choosing the values of real or integer variables from within an allowed set. This formulation, using a scalar, real-valued objective function, is probably the simplest example; the generalization of optimization theory and techniques to other formulations comprises a large area of applied mathematics. More generally, it means finding "best available" values of some objective function given a defined domain, including a variety of different types of objective functions and different types of domains. Quadratic programming is a special type of mathematical optimization problem. It is the problem of optimizing (minimizing or maximizing) a quadratic function of several variables subject to linear constraints on these variables. Quadratic programming allows the objective function to have quadratic terms, while the allowed set must be specified with linear equalities and inequalities. There are many software and hardware packages available that include quadratic programming solvers.

According to the present invention, a quadratic optimization problem is used, since distances play a role in the optimization problem. Instead of a quadratic optimization problem, absolute values of distances may be used, but squaring distances is preferred, since mathematical optimization software is tuned to linear and quadratic optimization problems. By using such software, the lightness compression is optimized for the specific image. The steepness values are optimized for preserving the lightness property such that the lightness of the destination colors remains within a range of the lightness property within the printer gamut. From the background art, a sigmoid compression based algorithm is known. An advantage of a piece-wise linear lightness compression is that such a function may approximate any arbitrary transfer function by taking a sufficient number of pieces. A goal is to calculate an optimal lightness compression function for each image with respect to observed image quality. In case of lightness in an L*a*b* color space, one can easily see that an optimal compression function looks different for a dominantly dark image than for a dominantly light one. For dark images, an optimal compression function should preserve details in dark colors whereas light images require a compression function preserving details in light colors. An advantage of a piece-wise linear lightness compression function is that optimal values of steepness may be determined by solving a constrained optimization problem. The method computes the steepness values by means of mathematical optimization for the image. The optimization takes the first measure, the second measure and the first constraint into account. This is advantageous, since the method intends to preserve lightness by means of the first measure, to preserve contrast by means of the second measure and to avoid out-of-gamut problems regarding the lightness component of a destination color by means of the first constraint.

According to another embodiment of the present invention, the mathematical optimization is a minimization of an objective function under the condition of the first constraint, which objective function comprises a first term for lightness preservation, said first term comprising the first measure for each translated and rotated source color in the image, and a second term for contrast preservation, said second term comprising the second measure for each translated and rotated source color in the image. By defining the objective function, lightness of the image is optimized and contrast of the image is optimized and the lightness value of each destination color lies in the printer gamut.

According to another embodiment of the present invention, the minimization of the objective function is constrained by a second constraint by which the absolute difference of each pair of subsequent steepness values is smaller than or equal to a predetermined length multiplied by a predetermined value of maximum change of steepness. The first constraint establishes that the lightness component of each translated and rotated source color is mapped to a lightness component lying in the range between the minimum lightness component of the destination colors and the maximum lightness component of the destination colors. By applying the second constraint to the optimization, a smooth compression is established. A smooth compression avoids sharp changes in the transfer function leading to contouring in transformed images.

According to another embodiment of the present invention, the first term is proportional to a sum of a squared difference of the lightness component of each translated and rotated source color and the lightness component of the corresponding destination color. By taking the sum of a squared difference of the lightness component of each translated and rotated source color and the lightness component of the corresponding destination color, a measure for the lightness preservation is obtained. Since the objective function contains also another term, the term for lightness preservation has been made proportional to this sum by means of a hand-tuned weight of color reproduction. This weight determines the contribution of the term for lightness preservation to the objective function. Experiments have revealed a preferred value for this weight. Choosing quadratic terms for the objective function is advantageous since many software and/or hardware implementations for optimization of such an objective function are available.

According to another embodiment of the present invention, the second term is a quadratic term defined as being proportional to a sum over all source colors of a sum over all neighboring source colors of each source color of a squared difference between a difference of a lightness component of said source color and a lightness component of a neighboring source color and a difference of a lightness component of the corresponding destination color and a lightness component of the corresponding neighboring destination color. By taking the sum in this manner, a measure for contrast preservation is obtained. Since the objective function contains also a term for lightness preservation, the term for contrast preservation has been made proportional to this sum by means of a hand-tuned weight of contrast reproduction. This weight determines the contribution of the term for contrast preservation to the objective function. Experiments have revealed a preferred value for this weight. Choosing quadratic terms for the objective function is advantageous, since many software and/or hardware implementations for optimization of such an objective function are available.

According to another embodiment of the present invention, the piece-wise linear lightness compression function is an adaptive local lightness compression, comprising a plurality of local compression functions, each of which is defined by carrying out a lightness compression function on a segment of the image, wherein the segments overlap and each local compression function acts only on lightness components of translated and rotated source colors in a middle of the corresponding segment and a corresponding objective function of each local compression function comprises a third term for a smooth transition of corresponding steepness values between neighboring segments. This embodiment may improve the method in the previous embodiment in preserving fine local details in light colors in a dominantly dark image or in dark colors in a dominantly light image. This embodiment calculates many local compression functions instead of a global one. A local compression function may be calculated by carrying out the global optimization on a segment of the image. This segment is called a sliding adaptation window, since pixels in this window are used to adapt the compression function. Once the compression function is determined, pixels undergo the locally optimal lightness adaptation. Only pixels in the very middle of the adaptation window are transformed rather than transforming all pixels of the adaptation window. This is advantageous since this strategy enables overlapping adaptation windows. Overlaps ensure moderate changes between neighboring compression functions leading to less visible blocking artifacts in the printed image.

The present invention further provides a printing apparatus for processing a digital image, comprising a control unit which is adapted to perform a method according to any of the preceding embodiments. The method is tuned to the printer gamut corresponding to the printing apparatus.

The present invention further provides a program stored in a non-transitory computer-readable medium for processing a digital image, said program including instructions for a computer to execute the method according to any of the preceding embodiments.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
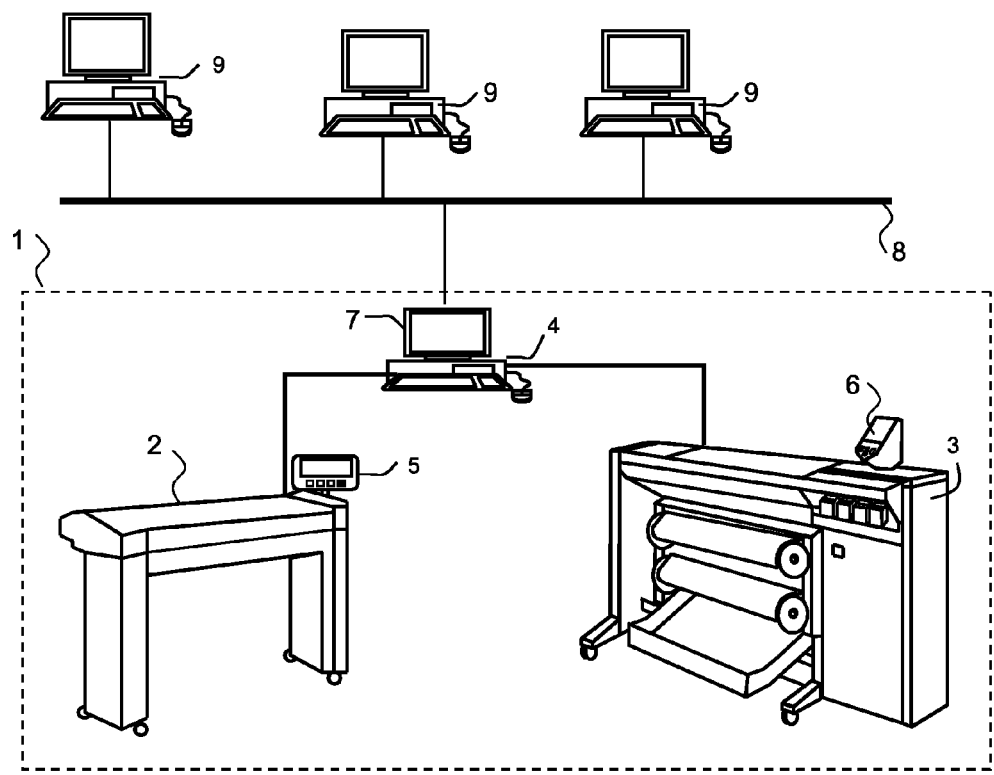
FIG. 1 is a schematic diagram of an environment in which the present invention may be used.

The present invention will now be described with reference to the accompanying drawings, wherein the same or similar elements are identified with the same reference numeral.

FIG. 1 is a schematic diagram of an environment in which the present invention may be used. The reprographic system 1, as presented here comprises a scanning unit 2, a printing unit 3 and a control unit 4.

The scanning unit 2 is provided for scanning an original color document supported on a support material. The scanning unit is provided with a CCD type color image sensor (i.e. a photoelectric conversion device), which converts the reflected light into electric signals corresponding to the primary colors red (R), green (G) and blue (B). A local user interface panel 5 is provided for starting scan and copy operations.

The printing unit 3 is provided for printing digital images on image supports. The printing unit may use any number of printing techniques. It may be a thermal or piezoelectric inkjet printer, a pen plotter, a press system based on a direct imaging process technology or a press system based on organic photoconductor technology, for instance. In the example shown in FIG. 1, printing is achieved using a wide format inkjet printer provided with four different basic inks, such as cyan, magenta, yellow and black. The housing contains a printhead, which is mounted on a carriage for printing swaths of images. The images are printed on an ink receiving medium such as a sheet of paper supplied by a paper roll. A local user interface panel 6 is provided with an input device such as buttons for selecting a user, a job and starting a printing operation, etc.

The scanning unit 2 and the printing unit 3 are both connected to a control unit 4. The control unit 4 executes various tasks such as receiving input data from the scanning unit 2, handling and scheduling data files, which are submitted via a network 8, controlling the scanning unit 2 and the printing unit 3, converting image data into printable data, etc. The control unit is provided with a user interface panel 7 for offering the operator an extensive menu of commands for executing tasks and making settings.

Moreover, the control unit is connected to the network 8, so that a number of client computers 9, also connected to the network, may make use of the reprographic system 1.

Figure 2:
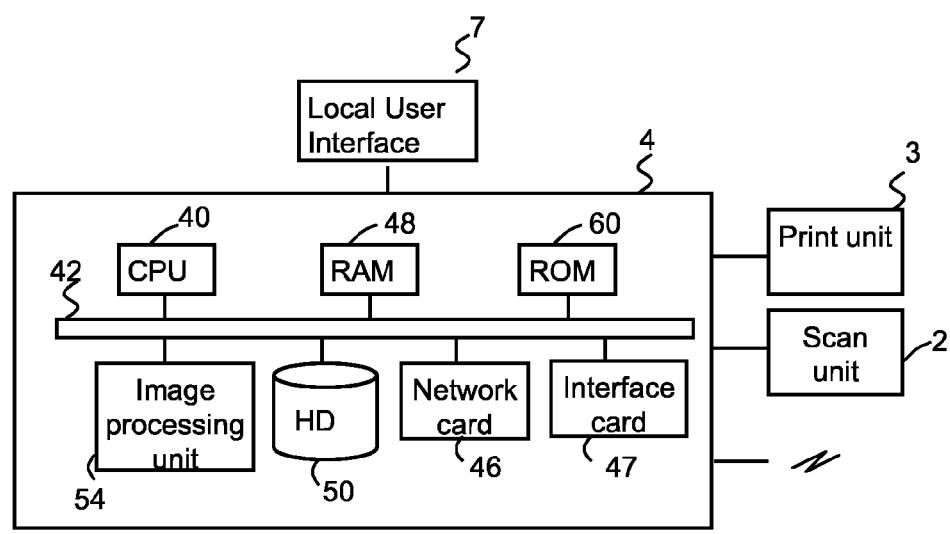
FIG. 2 is a schematic diagram of a control unit of a reprographic system according to FIG. 1.

The control unit is in more detail presented in FIG. 2. As shown in FIG. 2, the control unit 4 of the reprographic system 1 comprises a Central Processing Unit (CPU) 40, a Random Access Memory (RAM) 48, a Read Only Memory (ROM) 60, a network card 46, an interface card 47, a hard disk (HD) 50 and an image processing unit 54 (such as a Raster Image Processor or RIP). The aforementioned units are interconnected through a bus system 42.

The CPU 40 controls the respective units of the control unit 4, the local user interface 7, in accordance with control programs stored on the ROM 60 or on the HD 50. The CPU 40 also controls the image processing unit 54.

The ROM 60 stores programs and data such as boot program, set-up program, various set-up data or the like, which are to be read out and executed by the CPU 40.

The hard disk 50 is an example of a storage unit for storing and saving programs and data, which make the CPU 40 execute a print process to be described later. The hard disk 50 also comprises an area for saving the data of externally submitted print jobs. The programs and data on the HD 50 are read out onto the RAM 48 by the CPU 40 as needed. The RAM 48 has an area for temporarily storing the programs and data read out from the ROM 60 and HD 50 by the CPU 40, and a work area that is used by the CPU 40 to execute various processes.

Interface card 47 connects the control unit to scanning unit 2 and printing unit 3. Network card 46 connects the control unit 4 to the network 8 and is designed to provide communication with the workstations 9, and with other devices reachable via the network.

The image processing unit 54 may be implemented either as a software component of an operating system running on the control unit 4 or as a firmware program embodied in an FPGLA. The image processing unit 54 has functions for reading, interpreting and rasterizing the print job data. The print job data contains image data to be printed (i.e. fonts and graphics that describe the content of the document to be printed, described in a Page Description Language or the like), image processing attributes and print settings. In an advantageous embodiment, the image processing unit 54 carries out the method according to the present invention. Basic modes of operation for the reprographic system are scanning, copying and printing.

With the electric signals corresponding to the primary colors red (R), green (G) and blue (B) obtained during scanning, a digital image is assembled in the form of a raster image file. A raster image file is generally defined to be a rectangular array of regularly sampled values, known as pixels. Each pixel (picture element) has one or more numbers associated with it, generally specifying a color that the pixel should be displayed in. The representation of an image may have each pixel specified by three 8 bit (24 bits total) colorimetric values (ranging from 0-255) defining the amount of R, G, and B, respectively in each pixel. In the right proportions, R, G, and B can be combined to form black, white, 254 shades of grey, and a vast array of colors (about 16 million). Alternatively, the colors of the pixels of the digital image may be expressed in another color space such as Lab, L*a*b* or XYZ.

The digital image obtained by the scanning unit 2 may be stored on a memory of the control unit 4 and be handled according to a copy path, wherein the image is printed by the print engine 3. Alternatively, the digital image may be transferred from the controller to a client computer 9 (scan-to-file path). Finally, a user of the client computer 9 may decide to print a digital image, which reflects the printing mode of operation of the system.

Figure 3A:
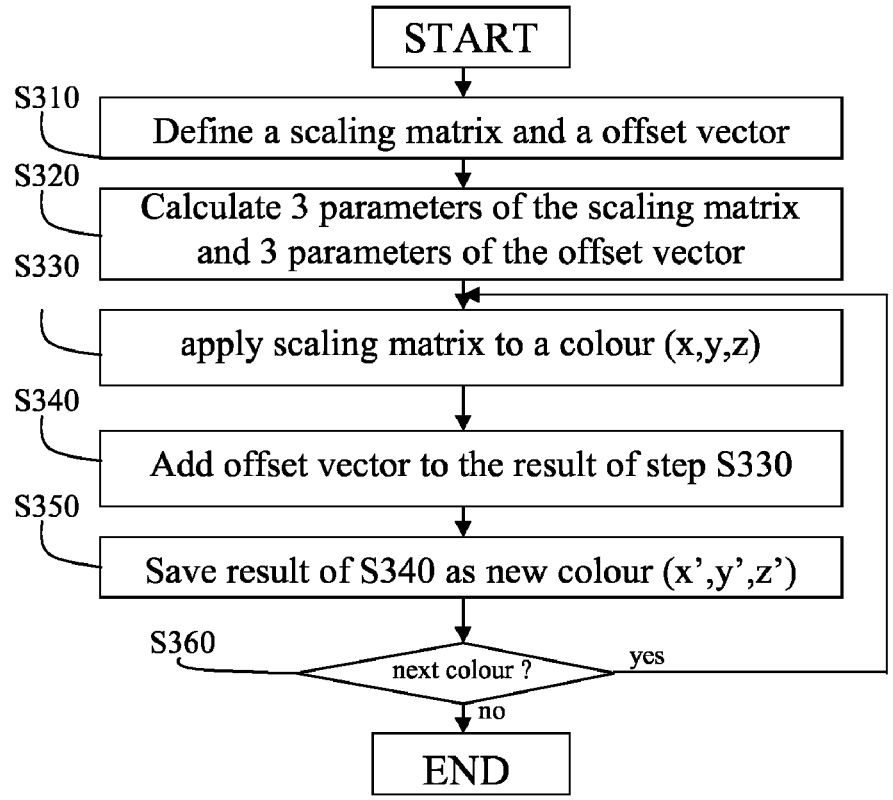
FIG. 3a is a flow diagram of the method from the background art describing a black and white point correction.

FIG. 3a shows a flow diagram of a method from the background art. In a first step S310, a scaling matrix and an offset vector are defined. In a second step S320, three parameters Sx, Sy, Sz of the scaling matrix and three parameters Ox, Oy, Oz of the offset vector are calculated, by means of the condition that a source black point is mapped to the destination black point and a source white point is mapped to the destination white point. In a third step S330, for each color (X, Y, Z) in the image, the scaling matrix is applied to this color (X, Y, Z). In a fourth step S340, the offset vector (Ox, Oy, Oz) is added to the result of the third step S330. In a fifth step S350, the result of the fourth step S340 is saved as a destination color (X',Y',Z'). In a last step S360, it is checked if there are any colors left to be processed. If so, the procedure returns to the third step S330 with the next color. If not, the procedure ends. The disadvantages of this method have been made clear above in the description.

In the following examples of embodiments, a color space L*a*b* is used to demonstrate the present invention. In such a color space, the L*-component of a color represents the lightness property of the color and the a*b*-components represent the chroma of the color. A person skilled in the art may understand that the examples may be accordingly adapted for application in a color space other than the L*a*b* color space, as far as the lightness property is representable in such a color space, for example by a line in such a color space.

Figure 3B:
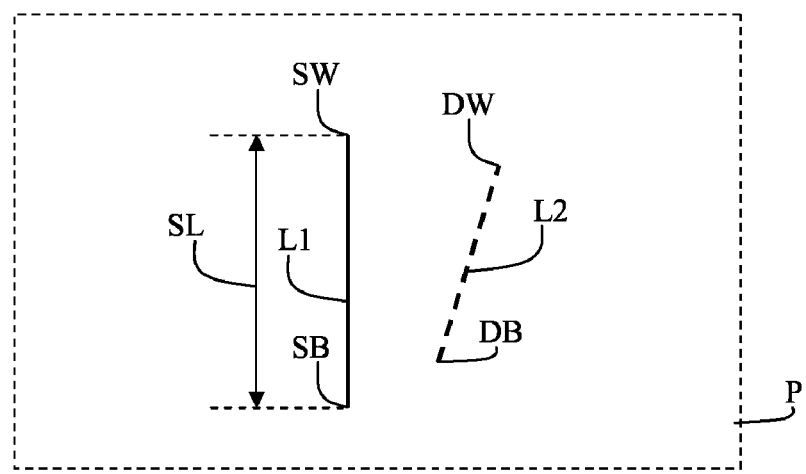
FIG. 3b illustrates schematically a part of a color space comprising two lightness axes.

As shown in FIG. 3b, a part P of a color space is shown comprising a first lightness axis L1 containing extreme points SW, SB of a color space in which the image is represented and a second lightness axis L2 containing extreme points DW, DB of a printer gamut. A first extreme point SW on the first lightness axis L1 may be called a source white point. A second extreme point SB on the first lightness axis L1 may be called a source black point. A first extreme point DW on the second lightness axis L2 may be called a destination white point. A second extreme point DB on the second lightness axis L2 may be called a destination black point. The goal of a mapping from the source colors of the image to output colors in the same color space is to map the source white point SW onto the destination white point DW and the source black point SB onto the destination black point DB. In general, the mapping does not only map the mentioned source colors SW, SB onto the mentioned destination colors DW, DB, but acts on all colors in the image gamut. Usually, the distance between the extreme points DW, DB on the second lightness axis L2 is approximately smaller than the distance between the extreme points SW, SB on the first lightness axis L1. Therefore, the mapping performs a compression of the lightness range to a percentage lower than 100% of the source length SL, defined as the distance between the source white point SW and the source black point SB.

In contrast with the before-mentioned scale-and-offset algorithm, the transformation according to an embodiment of the present invention is reconsidered from the point of view of preserving local detail visibility. Therefore, an algorithm has been designed that operates in the perceptually linear L*a*b* color space:

$$Lab_{src\text{-}black} \Rightarrow Lab_{dest\text{-}black} \quad (4)$$

$$Lab_{src\text{-}white} \Rightarrow Lab_{dest\text{-}white} \quad (5)$$

Figure 4:
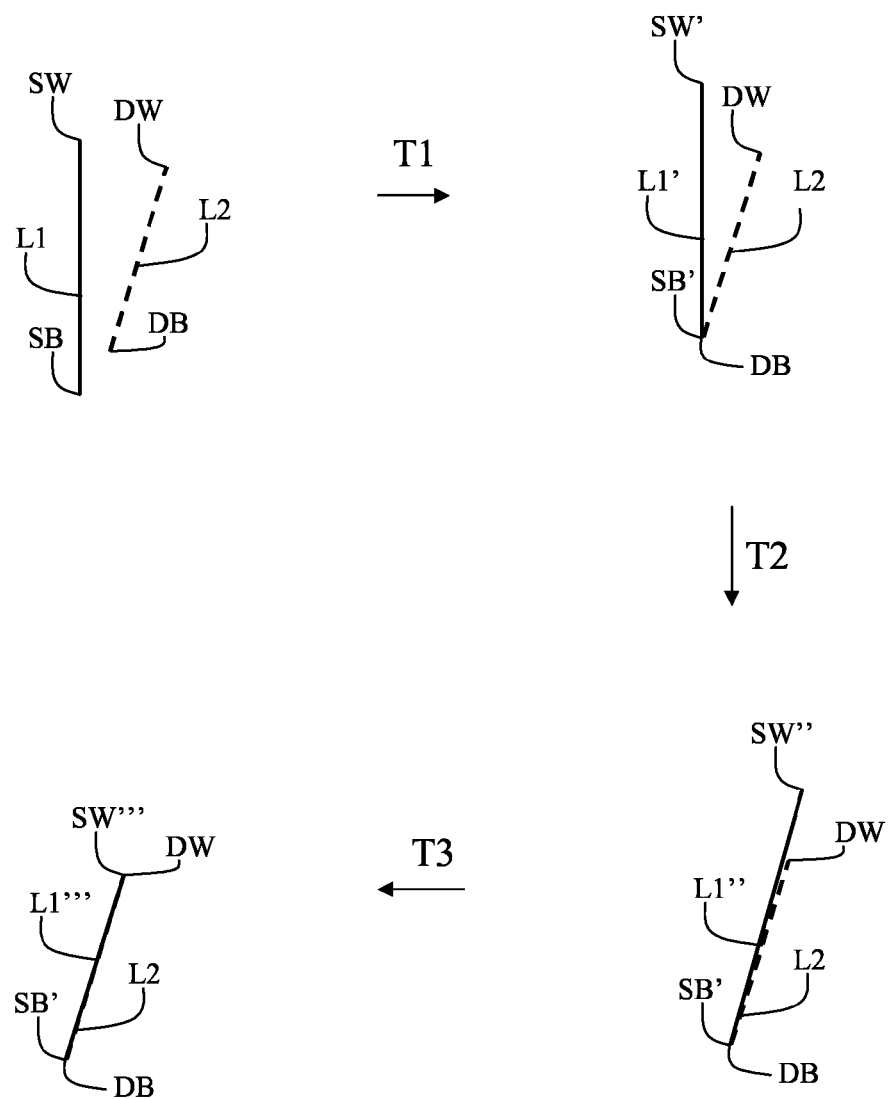
FIG. 4 illustrates schematically three transformation steps T1, T2, T3.

In the previously described scale- and -offset algorithm, a transformation is decomposed into a scaling step and an offset step. According to a preferred embodiment of the present invention, a method comprising another possible decomposition than the scaling step and the offset step is chosen. The method avoids scaling in all color space dimensions. This decomposition comprises three steps, which are illustrated in FIG. 4: an offset step T1 that maps the source black point SB to the destination black point DB resulting in a mapped source black point SB' and a mapped source white point SW'; a rotation step T2 that maps the direction of the line defined by the mapped source white point SW' and the mapped source black point SB' onto the direction of the line defined by the destination white point DW and the destination black point DB resulting in a rotated mapped source white point SW''; and a compression step T3 that maps the rotated mapped source white point SW'' onto the destination white point DW resulting in a compressed rotated mapped source white point SW'''.

The decomposition starts with an offset step T1 similar to the previously described known method. In the second step T2, a rotation matrix is applied mapping the direction of the source lightness axis L1 onto the destination lightness axis L2. It should be noted that rotation matrices have unity eigenvalues, and therefore, do not change distance between color points. Hence, distances between color points remained unchanged so far. Only in the last step T3, a compression is performed along the aligned lightness axes, being the rotated mapped source lightness axis L1'' and the destination lightness axis L2. An advantage of compressing in a single direction is that color distances measured on planes orthogonal to the destination lightness axis L2 remain unchanged. In comparison with the previously known scaling-and-offset algorithm, compression is applied in this case only in a single direction, rather than in three color directions to the same extent (approximately 20%). When implementing the third step T3 in a software program executed by the control unit of the reprographic system, a remarkable reduction of calculation times may be achieved.

The steps T1 and T2 may be visualized by a formula like:

$$\begin{pmatrix} L' \\ a' \\ b' \end{pmatrix} = Mrot * \begin{pmatrix} L + Ox - DBL \\ a + Oy - DBa \\ b + Oz - DBb \end{pmatrix} + \begin{pmatrix} DBL \\ DBa \\ DBb \end{pmatrix}$$

and $$Mrot = \begin{pmatrix} \cos(\alpha) & -\sin(\alpha) & 0 \\ \sin(\alpha) & \cos(\alpha) & 0 \\ 0 & 0 & 1 \end{pmatrix} \begin{pmatrix} \cos(-\beta) & 0 & \sin(-\beta) \\ 0 & 1 & 0 \\ -\sin(-\beta) & 0 & \cos(-\beta) \end{pmatrix} \begin{pmatrix} \cos(-\alpha) & -\sin(-\alpha) & 0 \\ \sin(-\alpha) & \cos(-\alpha) & 0 \\ 0 & 0 & 1 \end{pmatrix}$$

wherein $\alpha$ is an angle in the a*b*-plane between the projection of the vector (DWL-DBL, DWa-DBa, DWb-DBb), wherein (DBL, DBa, DBb) and (DWL, DWa, DWb) are the L*a*b*-coordinates of the respective destination black point and the destination white point, and the a*-axis, $\beta$ is the angle between the vector (DWL-DBL, DWa-DBa, DWb-DBb) and the L*-axis, and (Ox, Oy, Oz) is the offset vector of the offset step T1.

In another embodiment, the first two steps T1, T2 are exchanged. First, a rotation step is applied and then an offset step is applied. The rotation angle belonging to the rotation step is determined as being an angle between two crossing lines in a three-dimensional space, which is the angle between two lines parallel to the original lines, which two lines lie in a same plane (and thus always intersect each other).

Figure 5:
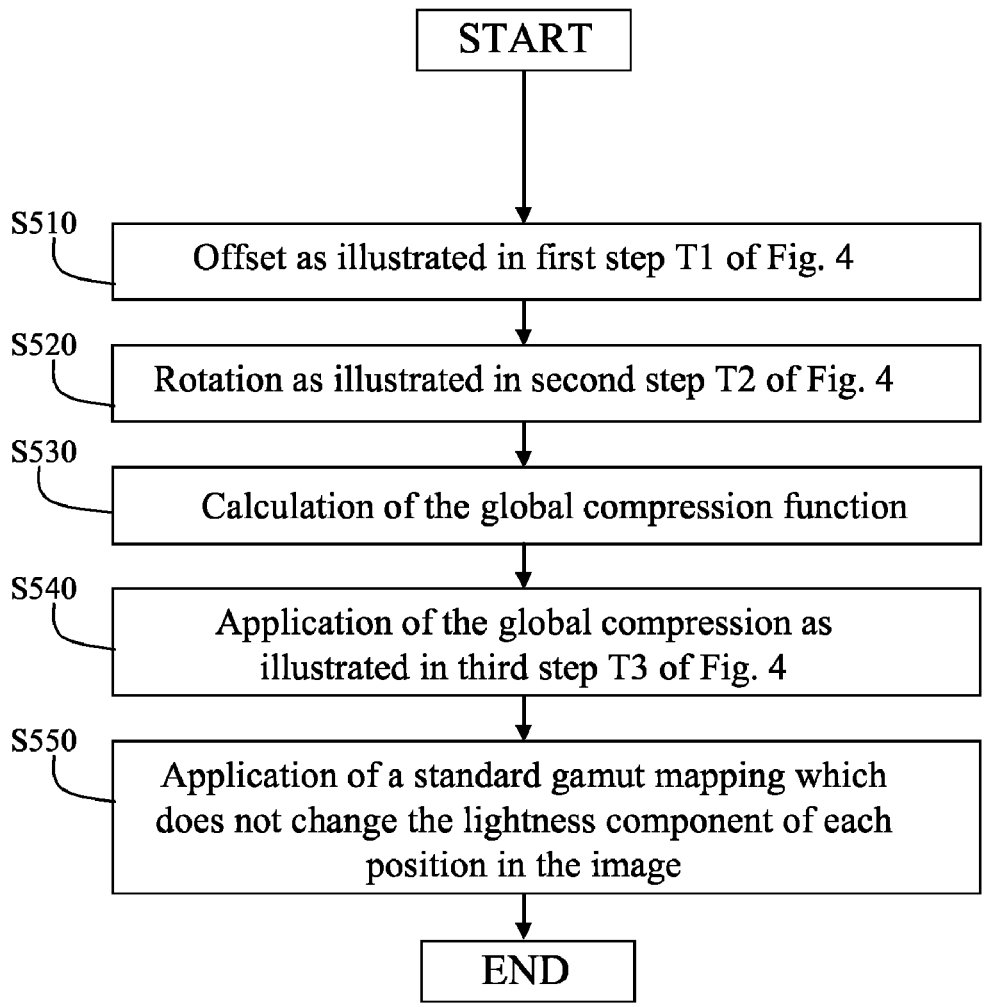
FIG. 5 is a flow diagram describing the transformation comprising a global optimal compression step according to an embodiment of the present invention.

The method is made up of the following steps as shown in FIG. 5. In a first step S510, an offset as illustrated in the first step T1 in FIG. 4 is applied to the image. In a second step S520, a rotation as illustrated in the second step T2 in FIG. 4 is applied to the result of the first step. In a third step S530, a global optimal compression function is calculated for the image resulting from the second step. The global optimal compression function may be obtained by the solution of the quadratic optimization problem according to the embodiment described before. In a fourth step S540, the global optimal compression function is applied as illustrated in the third step T3 of FIG. 4. A last step S550 is the application of a gamut mapping to the result of the fourth step, which gamut mapping only changes the chroma components a*b* of the color and leaves the lightness component L* unchanged. Examples of such a gamut mapping is described in the article titled "Gamut mapping: Evaluation of Chroma Clipping Techniques for Three Destination Gamuts" written by Ethan D. Montag, Mark D. Fairchild and Chester F. Carlson. By doing so, the result is an image with colors lying within or on a surface of the printer gamut.

Figure 6A:
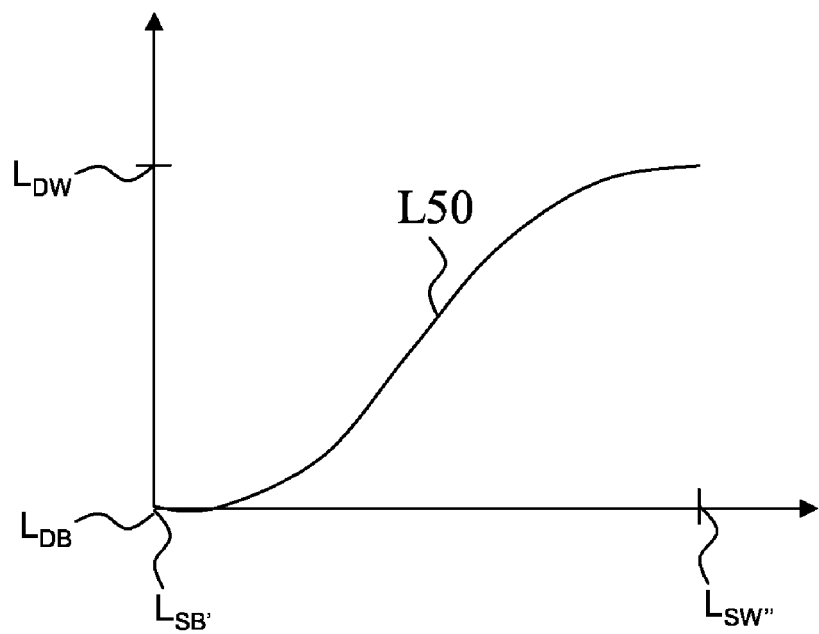
FIG. 6a illustrates a sigmoidal compression function according to the background art.

The compression in the third step T3 of FIG. 4 will now be further elucidated. The compression in the third step T3 of FIG. 4 may be visualized in the form of a compression function. FIG. 6a shows an example of a known sigmoid compression function, which may be used for this purpose. A horizontal axis represents lightness values along the mapped rotated source lightness axis L1" and a vertical axis represents lightness values along the destination lightness axis L2. Such a sigmoid compression function decreases a local difference between dark color pairs and a local difference between light color pairs. However, such a sigmoid compression function preserves or even enhances local contrast of color pairs close to a 50% lightness point L50. The extent of contrast enhancement depends on the steepness of the sigmoid at the 50% lightness point. The steepness may be varied inside an interval $[0 \ldots \infty]$. It should be noted that as the steepness decreases, the sigmoid function turns via a linear function into a logit function.

All source colors of the image may undergo the above described three steps T1, T2, T3. The compression function is the same for all source colors; therefore, this transformation depends only on the source color space and the printer gamut. Nevertheless, when comparing images processed by this method and the known method described before as scaling and offset in a XYZ color space, a visible increase in local detail visibility may be observed.

In a next embodiment of the present invention the previous embodiment is further improved by means of an image dependent black-white adaptation algorithm. From the background art, image dependent color management algorithms are known, which analyze the content of each image by means of color distribution, space filtering, etc. The extracted content is used during lightness compression and gamut mapping for adapting color management algorithms.

A black-white adaptation algorithm is an algorithm for mapping from the source colors of the image to output colors. To the output colors belong, amongst others, the destination white point and the destination black point. Such an algorithm maps the source white point to the destination white point and the source black point to the destination black point.

In the following, a black-white adaptation algorithm is presented, which makes use of parameters optimized for each individual image. Optimization is based on perceptual objectives such a color fidelity and local detail visibility.

Figure 6B:
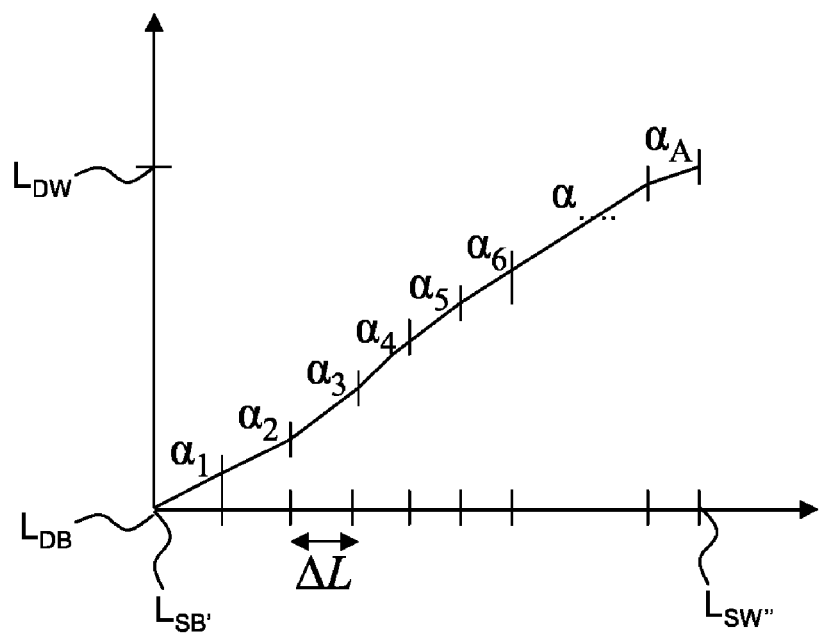
FIG. 6b illustrates a piecewise linear compression function according to an embodiment of the present invention.

In another embodiment of the present invention, the sigmoid compression based algorithm described above is changed by replacing the sigmoid function by an adaptive compression function. To this end, a piecewise linear compression function is used in the third step T3 of the method described in the previous embodiment. A schematic view of such a compression function is shown in FIG. 6b.

Taking a sufficient number A of pieces with respective steepness $\alpha_1, \alpha_2, \alpha_3, \ldots \alpha_A$ and each of the pieces having a projective length $\Delta L$ on the horizontal axis, this function can approximate any arbitrary compression function. An i-th parameter $\alpha_i$ defines the steepness (gradient) of an i-th piece (i varying from 1 to A) and the length $\Delta L$ depends on the number A of pieces.

Figure 6C:
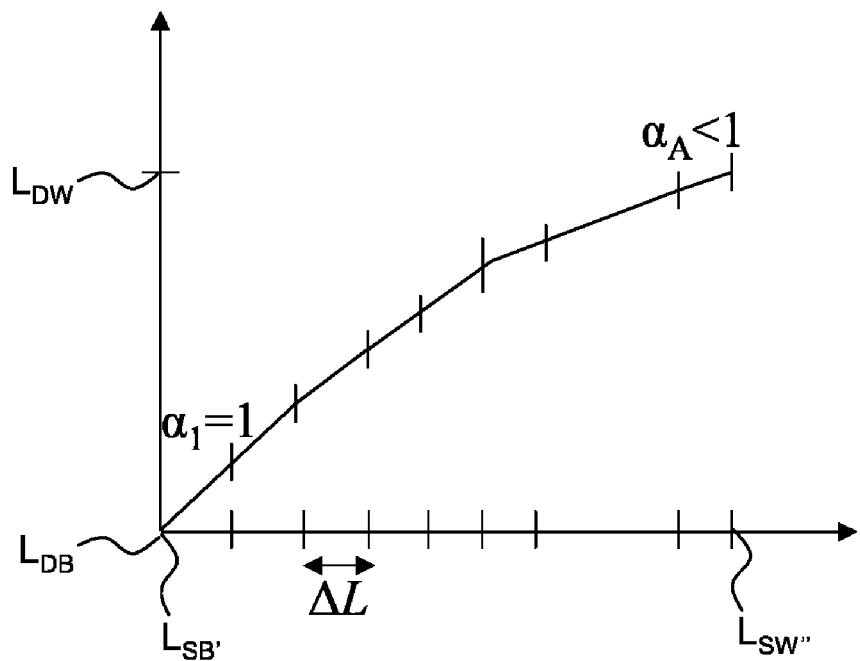
FIG. 6c illustrates a piecewise linear compression function suited for a dominantly dark image.
Figure 6D:
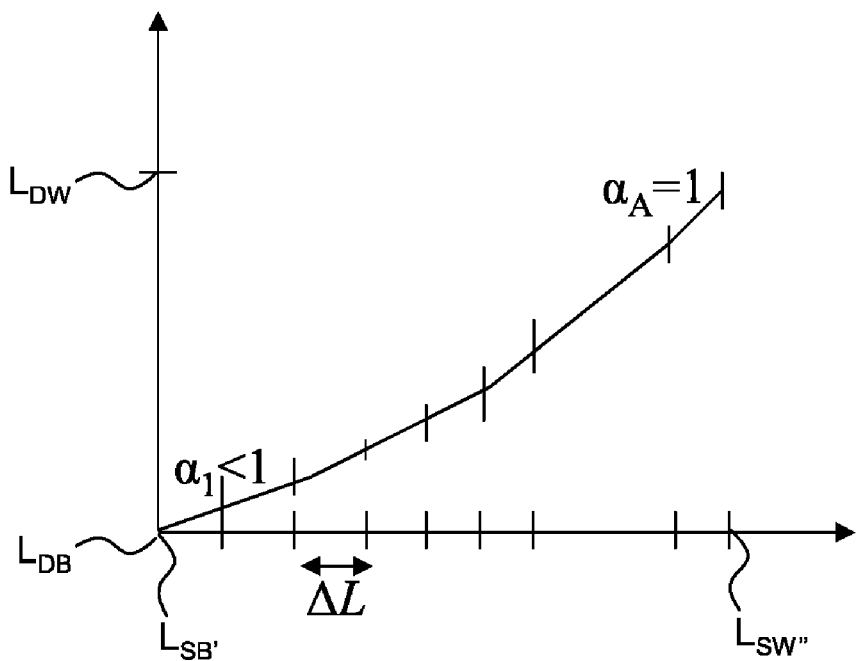
FIG. 6d illustrates a piecewise linear compression function suited for a dominantly light image.

The goal is to calculate an optimal compression function for each image with respect to observed image quality. An optimal compression function looks different for a dominantly dark image than for a dominantly light image. For a dominantly dark image, as shown in FIG. 6c, an optimal compression function should preserve details in dark colors, whereas a dominantly light image, as shown in FIG. 6d, requires an optimal compression function preserving details in light colors. For a dominant dark image, the steepness values $\alpha_1, \alpha_2, \alpha_3, \ldots \alpha_A$ are starting with $\alpha_1=1$ and ending with $\alpha_A<1$. For a dominant light image the steepness values $\alpha_1, \alpha_2, \alpha_3, \ldots \alpha_A$ are starting with $\alpha_1<1$ and ending with $\alpha_A=1$. In order to establish optimal steepness values for an image, the following quadratic optimization problem is defined. The optimization problem consists of minimizing an objective function O over the vector $\alpha_1^A=(\alpha_1, \alpha_2, \alpha_3, \ldots \alpha_A)$, and in the mean while satisfying two constraints C1, C2:

O:

$$w_l \sum_{ij \in I} [L_{ij} - L'_{ij}(\alpha_1^A)]^2 + w_c \sum_{ij \in I} \sum_{kl \in Neigh(ij)} [(L_{ij} - L_{kl}) - (L'_{ij}(\alpha_1^A) - L'_{kl}(\alpha_1^A))]^2.$$

C1:

$$\Delta L \sum_{a=1}^{A} \alpha_a = (L_{dest-white} - L_{dest-black})$$

C2:

$$|\alpha_a - \alpha_{a-1}| \leq \Delta L \cdot \partial \alpha_{max} \, a=2, \ldots, A$$

wherein the following symbols are used:
  $\alpha_1^A$: steepness vector of steepnesses $\alpha_1, \alpha_2, \alpha_3, \ldots \alpha_A$ of the compression function;
  I: image consisting of colors on position coordinates i j;
  $L_{ij}$: original lightness value on position i j;
  $L'_{ij}(\alpha_1^A)$: compressed lightness value on position i j;
  Neigh(ij): set of neighboring positions around i j, preferably the positions surrounding the position i j, preferably the eight positions with coordinates (i−1,j−1), (i−1,j), (i−1,j+1), (i,j−1), (i,j+1), (i+1,j−1), (i+1,j) and (i+1,j+1);
  $w_l$: hand-tuned weight of color reproduction. This weight determines the contribution of the first summand to the objective function O;
  $w_c$: hand-tuned weight of contrast reproduction. This weight determines the contribution of the second summand to the objective function O;
  $(L_{dest-white} - L_{dest-black})$: length of destination lightness axis L2; and
  $\partial \alpha_{max}$: predetermined maximum value of change in steepness.

The objective function O is an addition of two summands. The first summand of the objective function O is intended to preserve lightness. The second summand of the objective function O is intended to preserve contrast. The first constraint C1 ensures that the compressed lightness values are lightness values reproducible by the printer within the printer gamut. The second constraint C2 ensures that the compression is a smooth compression with a maximum change $\partial \alpha_{max}$ of steepness among the steepnesses $\alpha_1, \alpha_2, \alpha_3, \ldots \alpha_A$ of the compression function.

Hence, the optimal steepness vector $\alpha_1^A$ is determined by solving a constrained quadratic optimization problem. The optimum criterion of the objective function is perceptually motivated in the following senses:
  underlying color space L*a*b* is perceptually linear;
  the first summand of the objective function O preserves lightness values observed in the image; and
  the second summand of the objective function O preserves local details observed in the image.

The optimization problem is constrained by the first constraint C1 forcing the compression function to map all possible source lightness values onto valid destination lightness values. Furthermore, a second smoothing constraint C2 is also used to avoid sharp changes in the compression function leading to contouring in transformed images. Standard quadratic programming libraries may be used to solve this optimization. After preparing input data structures, a chosen mathematical library may carry out an iterative search process. A result of such a process is a sequence of steepness values $\alpha_1, \alpha_2, \alpha_3, \ldots \alpha_A$ optimal for the given input image.

In summary, this adaptive black-white adaptation algorithm applies a perceptually optimal compression function to each individual image.

Good results are achieved in experiments by the inventor with the following values for the parameters:

A: number of pieces approximately 100;

Neigh: neighborhood window size of 3×3 of positions of colors. For example, 8 colors positioned around a target color position (i,j) having the coordinates (i−1,j−1), (i−1,j), (i−1,j+1), (i,j−1), (i,j+1), (i+1,j−1), (i+1,j) and (i+1,j+1) and the target color position (i,j) itself;

$w_l$: hand-tuned weight of color reproduction, approximately 0.2. This weight determines the contribution of the first summand to the objective function O;

$w_c$: hand-tuned weight of contrast reproduction, approximately 1.0. This weight determines the contribution of the second summand to the objective function O;

$\partial \alpha_{max}$: predetermined maximum value of change in steepness, approximately 0.02. This constant may be dependent on the maximum absolute second derivative of the compression function. The constant may be approximately 0 to let the steepness of the compression function hardly change, the constant may be much larger than 0 to let the steepness of the compression function freely change and the constant may be −1 to let this constant be inactive.

The global optimal compression method performs on average significantly better than device dependent algorithms. Nevertheless, a single compression function is an outcome of a global optimization in which most frequent colors play a dominant role. So it can happen that fine local details in light colors are less preserved in a dominantly dark image.

In another embodiment of the present invention many local compression functions are calculated instead of one global compression function. In this way the method according to the previous embodiment is improved.

Figure 7:
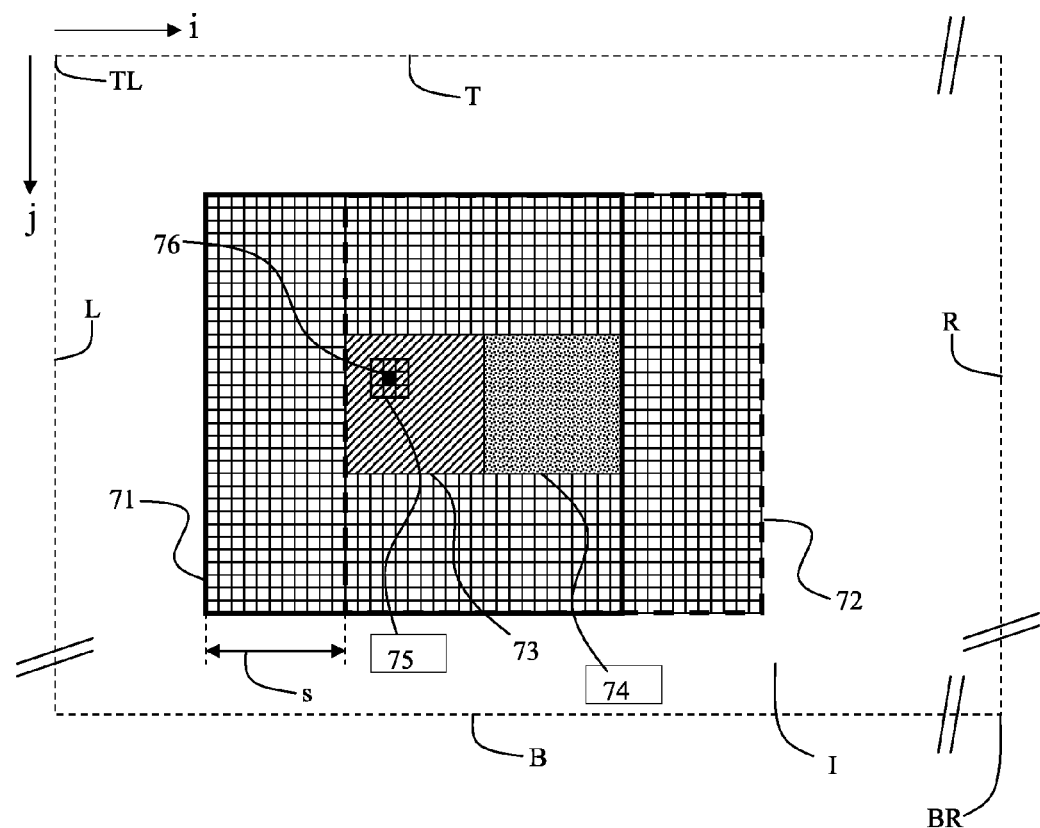
FIG. 7 is a representation of an image in which local optimal compression is explained.

FIG. 7 shows an image I in which local optimal compressions are calculated and used. The image I is completely divided in overlapping segments 71, 72. A local compression function may be calculated by carrying out the global optimization described in the previous embodiment on each segment 71, 72 of the image I. Such a segment 71 may be defined as a dense rectangle of positions with sides a×b, a and b being natural numbers both greater than or equal to 3. Preferably, the dense rectangle 71 equals a dense square (a=b). Hereinafter, the dense rectangle is assumed to be a dense square. A so-called sliding adaptation window is moved in a number of movements over the image I from the top-left corner TL of the image to the bottom-right corner BR of the image I. The dimensions of the adaptation window equal the dimensions of a segment 71, 72, in other words, a×b. The movements of the adaptation window over the image I are performed in such a way that each segments 71, 72 of the image I is once covered in a complete overlap. Colors in the segment covered by the adaptation window are used for determining the local compression function. Once the local compression function is determined, a part of the colors in the covered segment undergo a locally optimal black-white adaptation. In FIG. 7, the situation is shown wherein the adaptation window covers the segment 71. Only colors in a core 73 of the segment 71 are transformed rather than transforming all colors of the segment 71. This strategy enables overlapping segments, for example the segment 71 and the dashed segment 72. An overlap between two segments ensures moderate changes between neighboring compression functions leading to less visible blocking artifacts. The size s of the overlap determines also the size of the core 73. In FIG. 7, the segment size equals 33×33 positions, while the overlap size s equals 11 positions. The size of the core 73 equals 11×11 positions. For each position 76 with coordinates (i,j) in the segment 71, a neighborhood 75 has been defined, consisting of preferably eight pixels surrounding the position 76.

The sliding of the window over the image I starts with positioning the sliding adaptation window in a top left corner TL of the image I. Calculations are performed, which are described below, and the window is shifted over a distance s from a left side L of the image I to a right side R of the image I. For the colors in the segment covered by the window in the new position, the same calculations are performed. In this way, a first row of segments is worked up until the right side R of the image I is reached. When the sliding window reaches the right side R of the image I, the window is shifted to the left side L of the image I and then shifted towards the bottom side B of the image I over a distance s in a next row in the image I below the first row of segments which was just worked up. By shifting the sliding window from the top-left corner TL of the image I to the bottom-right corner BR of the image I in the indicated way, all positions (i,j) of the image I are worked up by calculations.

It may be clear for the skilled person that the sliding may also be performed column by column instead of row by row.

According to this embodiment an objective function O' and two constraints C1', C2' are used. Since the optimization is now carried out on segments of image I, a segment $S^{u,v}$ is mentioned in the objective function O', which segment has a central position (u,v). The adaptation window is moved by a number s of positions as explained above.

In order to establish optimal steepness values for a segment S of the image I, the following quadratic optimization problem is defined. The optimization problem consists of minimizing an objective function O' over the vector $\alpha_{1 \ldots A}^{u,v} = (\alpha_1^{u,v}, \alpha_2^{u,v}, \alpha_3^{u,v}, \ldots \alpha_A^{u,v})$ and in the mean while satisfying two constraints C1', C2':

O':

$$w_l \sum_{ij \in S} [L_{ij} - L'_{ij}(\alpha_{1 \ldots A}^{u,v})]^2 +$$

$$w_c \sum_{ij \in S^{u,v}} \sum_{kl \in Neigh(ij)} [(L_{ij} - L_{kl}) - (L'_{ij}(\alpha_{1 \ldots A}^{u,v}) - L'_{kl}(\alpha_{1 \ldots A}^{u,v}))]^2 +$$

$$w_t \sum_{a=1}^{A} (\alpha_a^{u,v} - \alpha_a^{u-s,v})^2 + (\alpha_a - \alpha_a^{u,v-s})^2$$

C1':

$$\Delta L \sum_{a=1}^{A} \alpha_a^{u,v} = (L_{dest-white} - L_{dest-black})$$

C2':

$$|\alpha_a^{u,v} - \alpha_{a-1}^{u,v}| \leq \Delta L \cdot \partial \alpha_{max} \quad a=2, \ldots, A$$

wherein the following symbols are used:

$S^{u,v}$: adaptation window with a central position (u,v). The central position (u,v) is the position in the middle of the adaptation window. Therefore, the size of a side of the adaptation window is preferably an odd number of positions;

s: shift value of adaptation window in both horizontal and vertical direction;

$\alpha_{1 \ldots A}^{u,v}$: steepness vector of steepnesses $\alpha_1, \alpha_2, \alpha_3, \ldots \alpha_A$ of the compression function for the segment $S^{u,v}$;

$L_{ij}$: original lightness value on position ij;

$L_{ij}'(\alpha_{1 \ldots A}^{u,v})$: compressed lightness value on position i j;

Neigh(ij): set of neighboring positions around i j. This may be preferably a set of eight surrounding positions as explained in the previous embodiment;

$w_l$: hand-tuned weight of color reproduction. This weight determines the contribution of the first summand to the objective function O';

$w_c$: hand-tuned weight of contrast reproduction. This weight determines the contribution of the second summand to the objective function O';

$w_t$: hand-tuned weight of transition smoothness. This weight determines the contribution of the third summand to the objective function O';

$(L_{dest-white} - L_{dest-black})$: length of destination lightness axis L2; and $\partial \alpha_{max}$: predetermined maximum value of change in steepness.

The objective function O' is an addition of three summands. The first summand of the objective function O' preserves lightness. The second summand of the objective function O' preserves contrast. The third summand of the objective function O' preserves a smooth transition between neighboring local compression functions. For the sake of simplicity, only the α values of compression functions which have a core directly left of the current core and directly above the current core, which α values are already calculated, are taken into account. This may be extended to α values of more neighboring local compression functions, which are already calculated. Increasing a hand-tuned weight of transition smoothness $w_t$ ensures slight changes between neighboring compression functions. It makes blocking artifacts disappear but leads to less preserved lightness and local contrast. A good balance between the hand-tuned weights $w_l$, $w_c$, $w_t$ has been found by the inventor with values as indicated below.

The first constraint C1' takes care of that the compressed lightness values are lightness values reproducible by the printer within the printer gamut. The second constraint C2' takes care of that the compression is a smooth compression with a maximum change $\partial \alpha_{max}$ of steepness among the steepnesses $\alpha_1, \alpha_2, \alpha_3, \ldots \alpha_A$ of the compression function.

Figure 8:
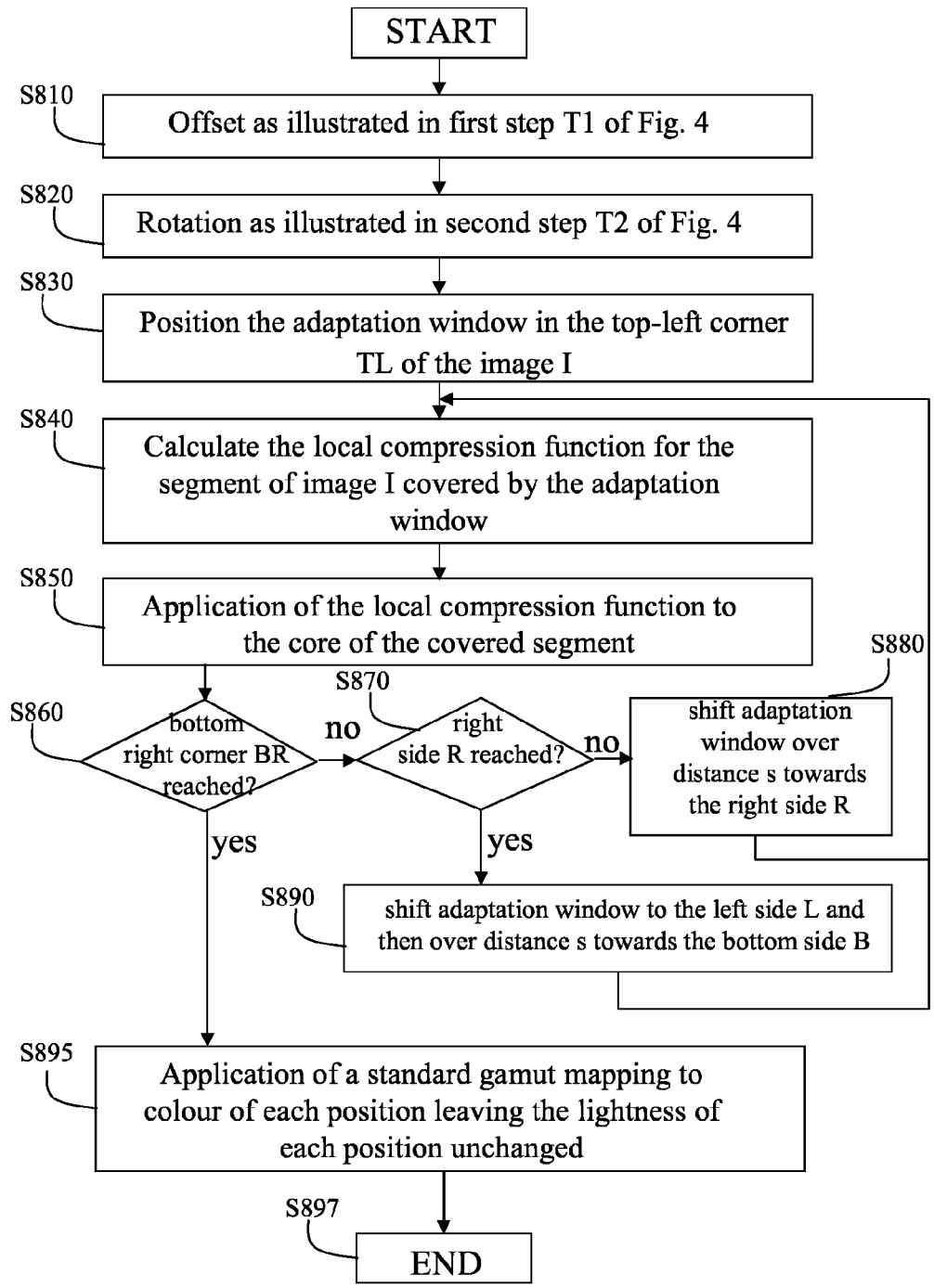
FIG. 8 is a flow diagram describing the transformation comprising local optimal compression steps according to an embodiment of the present invention.

In summary, this adaptive black-white adaptation algorithm applies a perceptually optimal local compression function to a segment of the image. The method is made up of the following steps shown in FIG. 8.

In a first step S810, the offset operation as illustrated in the first step T1 in FIG. 4 is applied on the whole image I. In a second step S820, the rotation as illustrated in the second step T2 in FIG. 4 is applied to the resulting image of the first step. In a third step S830, an adaptation window is created and positioned in the top-left corner TL of the image I. In a fourth step S840, the local compression function is calculated for the segment of the image I, which segment is covered by the adaptation window. The local compression function is tuned for the colors present in the segment as described in the embodiment above. In a fifth step S850, the local compression function is applied to the core of the covered segment, as illustrated by the compression step T3 of FIG. 4. A core 73 of a segment 71 is shown in FIG. 7. In a sixth step S860, it is checked if the adaptation window has reached to bottom-right corner BR of the image I.

If so, all segments of the image I have been operated upon, and in a last step S895, a standard gamut mapping is applied to the colors of the resulting image I. This standard gamut mapping changes the chroma components a*b* of each color, if necessary to get the color inside the printer gamut. This standard gamut mapping leaves the lightness component L* of each color unchanged. There is no need to change the lightness component of a color of the image I, since by application of the local compression function, defined above, the lightness component L* of each color of the image I is already within the printer gamut.

If not, it is checked in a seventh step S870, if the adaptation window has reached the right side R of the image I.

If so, the adaptation window is shifted in a eighth step S880 to the left side L of the image I, and then shifted over a distance s towards the bottom B of the image I, and the method returns to the fourth step S840.

If not, the adaptation window is shifted in a ninth step S890 over a distance s towards the right side R of the image I, and the method returns to the fourth step S840. For example, according to FIG. 7, the segment 71 will be shifted over a distance s being equal to 11, to the right side R of the image I, resulting in that the adaptation window covers a dashed segment 72.

Good results are achieved in experiments by the inventor with the following values for the parameters:

A: number of pieces approximately 10

Neigh: neighborhood window size of 9 of positions of colors;

Adaptation window size: 33×33, size of adaptation window in number of color positions;

s: adaptation window shift distance equal to 11, measured in number of color positions, which is also the size of each side of the core of which the colors are to be transformed;

$w_l$: hand-tuned weight of color reproduction, approximately 0.2;

$w_c$: hand-tuned weight of contrast reproduction, approximately 1.0;

$w_t$: hand-tuned weight of transition smoothness, approximately 4.0; and $\partial \alpha_{max}$: approximately 0.02 and is dependent on the maximum absolute second derivative of the compression function, may be approximately 0 to let the steepness of the compression function hardly change, may be much larger than 0 to let the steepness of the compression function freely change and may be −1 to let this constant be inactive.

Although the present invention has been described with reference to specific preferred embodiments thereof, it is to be understood that numerous variations and modifications can be made without departing from the invention.

Moreover, the above description of preferred embodiments of the invention presented a combination of specific method steps and parameter values. It is to be understood that the present invention is not limited to this specific combination of features. More particularly, these features are separable and can be combined in different sub-combinations. The scope of the invention is, thus, to be limited only as specifically mentioned in the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for mapping source colors of an image to destination colors reproducible by an printing apparatus, said source colors and destination colors having a lightness component, said method comprising the steps of:
   defining one of the source colors as a source black point;
   defining one of the source colors as a source white point;
   defining a source lightness line comprising the source black point and the source white point;
   defining one of the destination colors as a destination black point;
   defining one of the destination colors as a destination white point;
   defining a destination lightness line comprising the destination black point and the destination white point;
   defining a transformation from the source colors to the destination colors, the transformation mapping the source white point onto the destination white point and the source black point onto the destination black point; and
   applying the defined transformation to the source colors, wherein the transformation comprises:
      a translation and a rotation, the combination of translation and rotation mapping the source black point onto the destination black point and the source white point onto a point on the destination lightness line,
      a compression that maps the rotated and translated source white point onto the destination white point, the destination black point being a fixed point, and
      a gamut mapping that leaves the lightness component of each color unchanged and maps each compressed color onto a destination color, wherein said compression is only established in the direction of the destination lightness line.

2. The method according to claim 1, wherein the translation precedes the rotation.

3. The method according to claim 2, wherein the translation is defined by the difference vector of the destination black point and the source black point.

4. The method according to claim 2, wherein the rotation is defined by an angle between the destination lightness line and the source lightness line, a center of rotation being the destination black point.

5. The method according to claim 1, wherein the rotation precedes the translation.

6. The method according to claim 5, wherein the rotation is defined by an angle between the destination lightness line and the source lightness line, a center of rotation being any point on the source lightness line.

7. The method according to claim 5, wherein the translation is defined by the difference vector of the destination black point and the rotated source black point.

8. The method according to claim 1, wherein the source black point has a minimum lightness component among the colors on a lightness axis of a color space in which the image is defined, the source white point has a maximum lightness component among the colors on said lightness axis, the destination black point has a minimum lightness component among the destination colors reproducible by the printing apparatus and the destination white point has a maximum lightness component among the destination colors reproducible by the printing apparatus.

9. The method according to claim 1, wherein the compression is defined by a piece-wise linear lightness compression function, which is determined by the steps of:
   dividing the destination lightness line between the translated and rotated source white point and the translated and rotated source black point into a plurality of pieces;
   defining, for each piece resulting from said step of dividing, a linear mapping from said piece to a part of the lightness components of the destination colors, said linear mapping having a steepness, the value of which has to be determined,
   defining the lightness compression function as a composed linear mapping consisting of the plurality of linear mappings as defined in said step of defining a linear mapping;
   determining the steepness of each linear mapping of the lightness compression function by the steps of:
      defining a first measure in the color space for the distance between the lightness component of a translated and rotated source color and the lightness component of a corresponding destination color;
      defining a second measure in the color space for the distance between a lightness contrast of neighboring translated and rotated source colors and a lightness contrast of corresponding neighboring destination colors;
      defining a first constraint for the steepnesses to establish that the mapped lightness components of the translated and rotated source colors lie on the destination lightness line between the destination black point and the destination white point; and
      computing by means of mathematical optimization for said image the values of the steepnesses of the pieces, wherein said optimization takes the first measure, the second measure and the first constraint into account.

10. The method according to claim 9, wherein the mathematical optimization is a minimization of an objective function under the condition of the first constraint, the objective function comprising:
   a first term for lightness preservation, said first term comprising the first measure for each translated and rotated source color in the image; and
   a second term for contrast preservation, said second term comprising the second measure for each translated and rotated source color in the image.

11. The method according to claim 10, wherein the minimization of the objective function is constrained by a second constraint by which the absolute difference of each pair of subsequent steepness values ($\alpha_i$, $\alpha_{i+1}$) is smaller than or equal to a predetermined length ($\Delta L$) multiplied by a predetermined value ($\delta\alpha_{max}$) of maximum change of steepness.

12. The method according to claim 9, wherein the piece-wise linear lightness compression function is an adaptive local lightness compression, comprising a plurality of local compression functions, each of the plurality of local compression functions being defined by carrying out a lightness compression function on a segment of the image, wherein the segments overlap and each local compression function acts only on lightness components of translated and rotated source colors in a middle of the corresponding segment, and a corresponding objective function of each local compression function comprises a third term for a smooth transition of corresponding steepness values between neighboring segments.

13. A printing apparatus for processing a digital image, comprising a control unit adapted to perform the method according to claim 1.

14. A program stored in a non-transitory computer-readable medium for processing a digital image, said program including instructions for a computer to execute the method according to claim 1.

* * * * *